(12) United States Patent
 Berube

(10) Patent No.: US 8,987,627 B2
(45) Date of Patent: Mar. 24, 2015

(54) DUAL SEAM ELECTRIC RESISTANCE WELDED TUBES

(75) Inventor: Eric Berube, Edmonton (CA)

(73) Assignee: DFI Corporation, Edmonton (CA)

(*) Notice: Subject to any disclaimer, the term of this patent is extended or adjusted under 35 U.S.C. 154(b) by 273 days.

(21) Appl. No.: 13/098,762

(22) Filed: May 2, 2011

(65) Prior Publication Data

US 2011/0308660 A1    Dec. 22, 2011

Related U.S. Application Data

(60) Provisional application No. 61/329,721, filed on Apr. 30, 2010.

(51) Int. Cl.
*B23K 13/01* (2006.01)
*B23K 11/087* (2006.01)
*B21C 37/08* (2006.01)

(52) U.S. Cl.
CPC ............ *B23K 11/0873* (2013.01); *B21C 37/08* (2013.01)
USPC ........................ 219/60.2; 219/60 R; 219/59.1

(58) Field of Classification Search
USPC .............. 219/50, 61.2, 60 R, 61, 61.11, 61.3, 219/59.1, 60 A, 62, 61.6
See application file for complete search history.

(56) References Cited

U.S. PATENT DOCUMENTS

| 2,009,685 | A | | 7/1935 | Caputo |
| 2,502,012 | A | * | 3/1950 | Kinkead ......................... 228/5.1 |
| 2,647,981 | A | * | 8/1953 | Wogerbauer ................. 219/59.1 |
| 2,950,376 | A | | 8/1960 | Wogerbauer |
| 3,132,234 | A | | 5/1964 | Wogerbauer |
| 3,263,053 | A | * | 7/1966 | Rudd ............................ 219/61.2 |
| 3,603,761 | A | * | 9/1971 | Wogerbauer ................. 219/59.1 |
| 3,707,257 | A | | 12/1972 | Wogerbauer et al. |

FOREIGN PATENT DOCUMENTS

GB           104689        1/1918

* cited by examiner

*Primary Examiner* — Brian Jennison
(74) *Attorney, Agent, or Firm* — Bennett Jones LLP

(57) ABSTRACT

A method of continuously forming a dual seam welded tubular product includes the steps of providing two coils of sheet metal material, uncoiling the two coils and forming the material into opposing sections, bringing the two opposing sections together at a convergence angle of less than about 4°; and welding the two seams created between the two opposing sections. An apparatus is configured to bring the sections together at a convergence angle less than about 4° to produce the tubular product. The tubular product may have a diameter greater than 26 inches.

9 Claims, 4 Drawing Sheets

DUAL SEAM ELECTRIC RESISTANCE WELDED TUBES

CROSS REFERENCE TO RELATED APPLICATIONS

This application claims the priority benefit of U.S. Provisional Application No. 61/329,721 filed on Apr. 30, 2010 entitled "Dual Seam Electric Resistance Welded Tubes", the entire contents of which are incorporated herein by reference.

FIELD OF THE INVENTION

The present invention is directed to methods and apparatuses for forming dual seam welded tubes.

BACKGROUND

Electric resistance welding (ERW) refers to a group of welding processes such as spot and upset welding that produce coalescence of faying surfaces where heat to form the weld is generated by the resistance of the welding current through the workpieces. Some factors influencing heat or welding temperatures are the proportions of the workpieces, the electrode materials, electrode geometry, electrode pressing force, weld current and weld time. Small pools of molten metal are formed at the point of greatest electrical resistance (the connecting surfaces) as a high current (100-100,000 A) is passed through the metal. In general, resistance welding methods are efficient and cause little pollution, but their applications are limited to relatively thin materials and the equipment cost can be high.

Upset welding relies on two electrodes to apply current to join metal sheets. However, instead of pointed electrodes, contacts or induction coils are used to induce current, making it possible to make long continuous welds.

Upset welding is mainly used on the seams of tubes and pipes for its ease and accuracy. The resulting weld is extremely durable due to the length of the contact area. A coil of metal sheet is uncoiled to flat, and formed continuously into a tube using forming rolls.

Tubes formed from metal sheet may be formed with a single seam or with dual seams. Dual seam mills are known where two semi-circular sections are formed separately and then brought together for welding. This process requires some twisting or deformation of the semi-circular sections prior to joining. As shown in prior art FIG. 1, welding pressure at the welding point (7) between the two semi-tubes (1, 2) is produced by deflection between the spreaders (3, 4) and the electrode rollers (5, 6). However, excessive bending or twisting will result in an inferior product, particularly as the diameter of tube becomes larger.

There is a need in the art for an improved dual seam welding process, particularly for tubular products of a larger diameter.

SUMMARY OF THE INVENTION

The present invention comprises improved methods and apparatuses for forming a dual seam welded tubular product. In one aspect, the invention comprises a method which forms two half-tubes and welds them together with a low convergence angle, which may be less than about 4°. In another aspect, the invention may comprise an apparatus which has at least one upper forming roller pair, and at least one lower forming roller pair, where the upper and lower roller pairs are interleaved in order to reduce the convergence angle at the welding point.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows.

DETAILED DESCRIPTION OF PREFERRED EMBODIMENTS

The invention relates to a method and apparatus of forming a dual seam welded tubular product. When describing the present invention, all terms not defined herein have their common art-recognized meanings. To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

In general terms, one aspect of the invention comprises a method of continuously forming a dual seam welded tubular product, comprising the steps of:
 (a) providing two coils of sheet metal material;
 (b) uncoiling the two coils and forming the material into opposing sections, each having a generally semi-circular cross-section;
 (c) bringing the two opposing sections together at a convergence angle of less than about 4°; and
 (d) electric resistance welding the two seams created between the two opposing sections.

Figure 2:
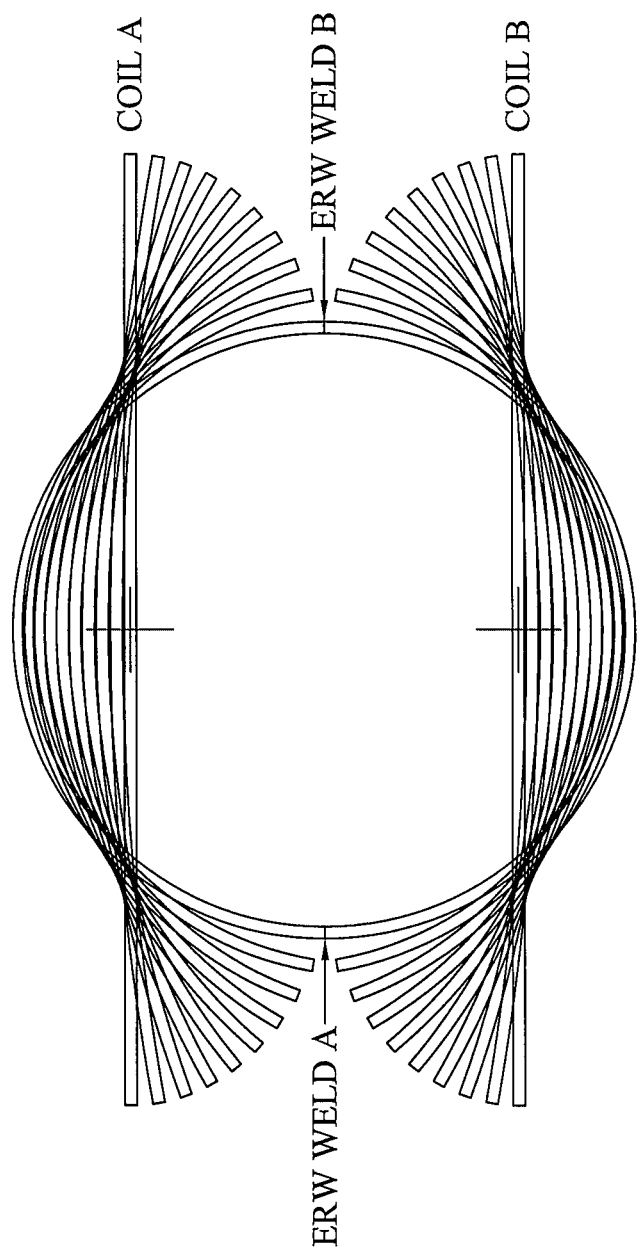
FIG. 2 is a cross-sectional view of the "forming flower" produced by one embodiment of the present invention.

In another aspect, the invention comprises an apparatus for continuously forming a dual seam welded tubular product from two coils of sheet metal material, comprising:
 (a) a first forming roller having an upper concave roller and a lower convex roller, for forming an upper half-tube;
 (b) a second forming roller having a lower concave roller and an upper convex roller, for forming a lower half-tube;
 (c) wherein the first forming roller and the second forming roller are positioned such that a convergence angle of the upper and lower half-tubes is less than about 4°;
 (d) an electric resistance welding device The tubular products produced by methods and apparatuses of the present invention are continuously formed from two substantially similar, opposed semi-circular half-tubes. Each half-tube is formed from a length of flat sheet material, typically stored as a coil, which is passed through at least one pair, and preferably multiple pairs of forming rollers. Each pair of forming rollers brings the initially flat material closer to its final semi-circular shape. When viewed in transverse cross-section, the changing shape of material is termed a "forming flower", as shown in FIG. 2.

Figure 3B:
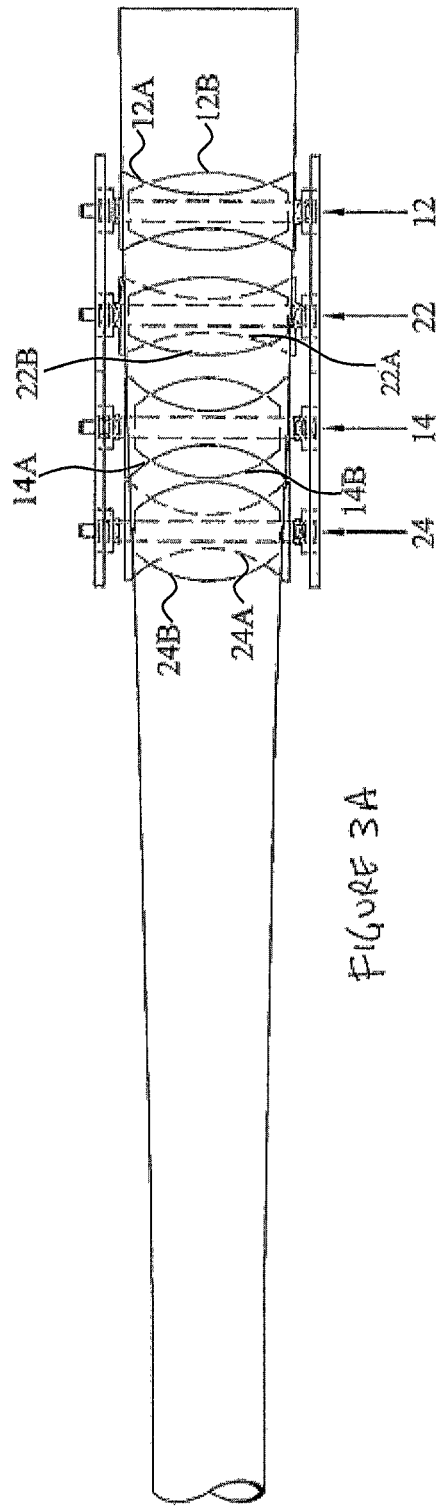
FIGS. 3A (top plan) and 3B (side view) are a schematic depiction of the forming rollers of one embodiment.
Figure 3B:
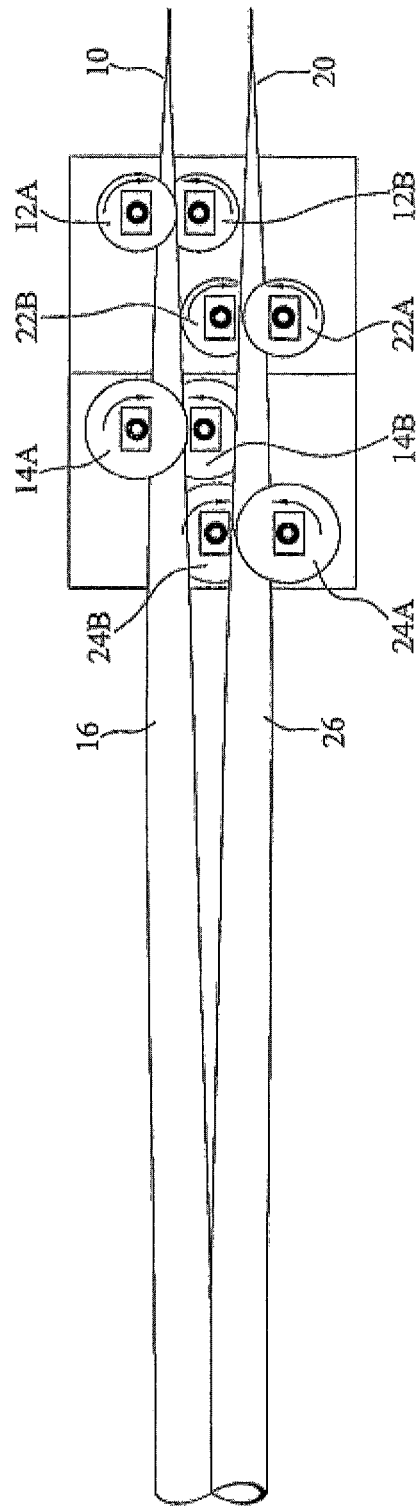

As shown in FIG. 3, the upper coil of sheet material (10) is fed into a first upper forming roller pair (12), consisting of an upper concave roller (12A), and a lower convex roller (12B). The first forming roller pair produces an intermediate shape. In one embodiment, the material then passes through one or more additional forming roller pairs (14A, 14B) to create the final semi-circular shape of the upper half-tube (16).

The lower coil of sheet material is fed through a first lower forming roller pair (22), consisting of a lower concave roller (22A) and an upper convex roller (22B). As with the upper sheet, additional foaming roller pairs (24A, 24B) create the final shape of the lower half-tube (26).

Figure 1:
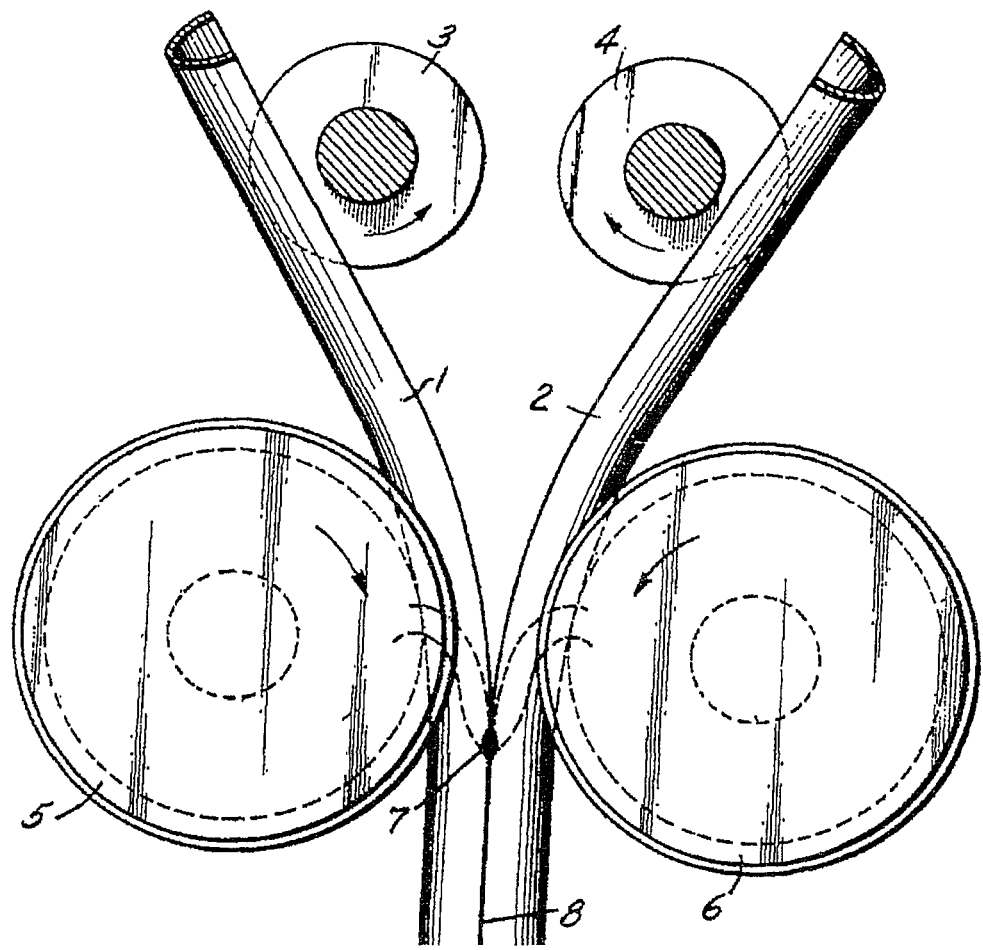
FIG. 1 is a schematic depiction of a prior art dual seam forming process.

An important element of the present invention is the convergence angle between the upper and lower half-tubes (16, 26). The convergence angle is the angle at which the lower half-tube and the upper half-tube meet at during the forming and welding process. In the prior art, as exemplified in prior art FIG. 1, that convergence angle is large, which reduces the quality of the welded seams. In one embodiment of the present invention, the range of the convergence angle is below about 4°, preferably between about 2° to about 4°. Keeping the convergence angle within this range enables the proximity effect to increase the efficiency substantially. The heat affected zone is minimized as only the faying edges are heated. Another benefit to keeping the convergence angle small is a homogenous strain profile around the circumference of the tube. With higher angles, such as those above 4°, the edges being welded are strained excessively as their direction changes abruptly at the welding point (30), causing irregularities in the finished product.

Accordingly, in one embodiment, the apparatus is arranged to minimize the convergence angle. This is accomplished by overlapping or interleaving the upper and lower forming rollers, such that the two half-tubes are formed closer together. As may be seen in FIGS. 3B and 4, the lower roller (12B, 14B) of the upper roller pair is substantially horizontally planar with the upper roller (22B, 24B) of the lower roller pair. As a result, the upper roller pair (12) and the lower roller pair (22) must be spaced laterally, but that does not significantly adversely affect the forming process or the final product. In one embodiment, the convergence angle is less than about 4°, and is preferably about 3°. As used herein, the term "about" denotes a possible variance of 10% above or below the stated value and may also reflect imprecision of the available methods of measuring the stated value.

Welding occurs at the welding point (30) using an electric resistance welding device (40), which are well known in the art, and further description thereof is unnecessary. The specific nature of the welding method is not an essential element of the present invention.

Because the end-product is formed from two coils of material, the tubular product will have a circumference equal to approximately twice the width of the coiled material. The low convergence angle permitted by implementing the present invention allows large diameter product to be produced by the dual seam welding process. In one embodiment, tubular products having diameters in excess of about 26" may easily be produced. Single seam products have not exceeded 26" in diameter because of limitations of the width of the coiled sheet material. Larger diameter dual seam products have not been made due to the stresses and inconsistencies produced during the forming process in the prior art.

Figure 4:
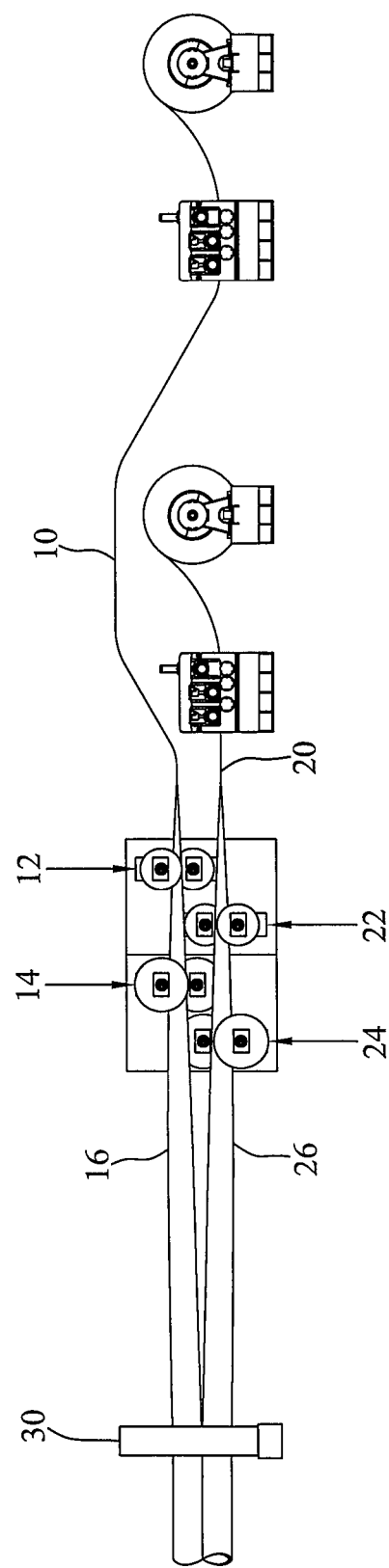
FIG. 4 is a schematic depiction of one embodiment of a dual seam forming apparatus of the present invention.

The terms "upper", "lower", "vertical", "horizontal" and the like have been used herein in reference to the orientation shown in FIGS. 3 and 4. However, those skilled in the art may adapt the methods and apparatuses described and shown herein to shift the orientation of the components shown. In particular, the forming process may be rotated such that the two half-tubes are facing each other horizontally, as opposed to vertically. Alternatively, the material may be fed through the forming rollers and welding device vertically, or at an angle, as opposed to the horizontal orientation shown in the Figures.

As will be apparent to those skilled in the art, various modifications, adaptations and variations of the foregoing specific disclosure can be made without departing from the scope of the invention claimed herein.

What is claimed is:

1. A method of continuously forming a dual seam welded tubular product, using a first forming roller pair having an outer concave roller and an inner convex roller, and a second forming roller pair having an outer concave roller and an inner convex roller, wherein the inner convex roller of the first forming roller pair and the inner convex roller of the second forming roller pair overlap in an longitudinal plane, the method comprising the steps of:
   (a) providing a first coil and a second coil of sheet metal material;
   (b) uncoiling the first coil and the second coil and forming the material into two opposing generally semi-circular half-tubes and bringing the two opposing half-tubes together at a convergence angle by feeding the material of the first coil longitudinally through the first forming roller pair, and feeding the material of the second coil longitudinally, through the second forming roller pair; and
   (c) electric resistance welding the two seams created between the two opposing half-tubes.

2. The method of claim 1 wherein the convergence angle is less than about 4°.

3. The method of claim 1, wherein the tubular product has a diameter greater than about 26 inches.

4. An apparatus for continuously forming a dual seam welded tubular product from a first coil and a second coil of sheet metal material, the apparatus comprising:
   (a) a first forming roller pair having an outer concave roller and an inner convex roller, for forming a generally semi-circular first half-tube from the first coil fed longitudinally through the first forming roller pair;
   (b) a second forming roller pair having an outer concave roller and an inner convex roller, for forming a generally semi-circular second half-tube from the second coil fed longitudinally through the second forming roller pair;
   (c) wherein the inner convex roller of the first forming roller pair and the inner convex roller of the second forming roller pair are overlapped in a longitudinal plane to bring the first and second half-tubes together at a convergence angle; and
   (d) an electric resistance welding device for receiving and welding together the first and second half-tubes.

5. The apparatus of claim 4 wherein the convergence angle is between about 2° and less than about 4°.

6. The apparatus of claim 4 wherein the first and second forming rollers pairs are configured to produce a tubular product having a diameter greater than about 26 inches.

7. The apparatus of claim 4 wherein the inner convex roller of the first forming roller pair and the inner convex roller of the second forming roller pair are positioned substantially longitudinally co-planar.

8. The method of claim 1 wherein the inner convex roller of the first forming roller pair and the inner convex roller of the second forming roller pair are positioned substantially longitudinally co-planar.

9. The method of claim 2, wherein the tubular product has a diameter greater than about 26 inches.

* * * * *